United States Patent [19]

Azuma et al.

[11] 3,925,322
[45] Dec. 9, 1975

[54] ANAEROBIC CURABLE COMPOSITIONS

[75] Inventors: Kishiro Azuma; Isao Tsuji; Hiroyuki Kato; Hidemaro Tatemichi; Akira Motegi; Osamu Suzuki; Kishichiro Kondo, all of Nagoya, Japan

[73] Assignee: Toagosei Chemical Industry Co., Ltd., Tokyo, Japan

[22] Filed: Jan. 4, 1974

[21] Appl. No.: 430,782

[30] Foreign Application Priority Data
Jan. 19, 1973   Japan................................. 48-8419

[52] U.S. Cl. ... 260/78.4 E; 260/75 EP; 260/75 UA; 260/76; 260/78.4 EP; 260/78.5 B; 260/78.5 E; 260/89.5 R; 260/89.5 A
[51] Int. Cl.² ............. C08F 18/14; C08F 18/16; C08F 22/14; C08F 120/20
[58] Field of Search.... 260/78.4 E, 78.4 EP, 78.5 B, 260/78.5 E, 89.5 A, 89.5 R, 76

[56] References Cited
UNITED STATES PATENTS

| | | | |
|---|---|---|---|
| 3,203,941 | 8/1965 | Krieble | 260/89.5 |
| 3,218,305 | 11/1965 | Krieble | 260/89.5 |
| 3,759,808 | 9/1973 | Parker et al. | 204/159.23 |
| 3,775,385 | 11/1973 | Ozono et al. | 260/79 |

*Primary Examiner*—John Kight, III
*Attorney, Agent, or Firm*—Cooper, Dunham, Clark, Griffin & Moran

[57] ABSTRACT

An anaerobic curable composition useful as a sealant or adhesive comprises a hydroperoxide, a 1,1-dialkylhydrazine, a polyesterpolyacrylate and/or polyesterpolymethacrylate or an anaerobic monomer mixture containing the acrylate or methacrylate.

8 Claims, No Drawings

ANAEROBIC CURABLE COMPOSITIONS

This invention relates to anaerobic curable compositions. The term "anaerobic" is used herein to describe that property of a composition or material whereby the material is stable for a long period of time in the presence of air or oxygen but becomes unstable or polymerizes in the absence of air or oxygen.

In accordance with Japanese Patent Publication No. 6545/1968, a composition produced by adding to tetraethyleneglycol dimethacrylate, as the principal ingredient, N,N-dimethyl-p-toluidine, orthobenzsulfimide, 1,4-benzoquinone and dialkylperoxide exhibits excellent stability but does not show good torque strength. Similarly, Japanese Patent Publication Nos. 2393/1960 and 3595/1963 disclose that when the anaerobic monomer is polyalkyleneglycol dimethacrylate, the use of organic hydroperoxide is effective while in case of ketoneperoxide and diacylperoxide, there is difficulty with respect to storage stability and it is difficult to maintain the balance between the setting or curing time and the storage stability. Further, Japanese Patent Publication No. 852/1969 also discloses that when the anaerobic monomer is a polyesterdimethacrylate, an organic hydroperoxide is similarly effective.

Investigations in accordance with this invention have been directed to the fact that an organic hydroperoxide is an effective peroxide and to the use of compounds suitable in connection therewith as accelerators.

It has been now found that there is obtainable a composition capable of balancing the setting time and the storage stability by employing a 1,1-dialkylhydrazine or its salt in compositions in accordance with this invention together with a hydroperoxide.

According to the present invention, there is provided an anaerobic curable composition which comprises a hydroperoxide, a 1,1-dialkylhydrazine or salt thereof, a polyesterpolyacrylate and/or polyesterpolymethacrylate or an anaerobic monomer mixture containing the acrylate or methacrylate.

The anaerobic compositions according to this invention exhibits the following properties:

I. The anaerobic composition is stable for several years at a normal temperature with respect to the storage stability. Neither gelation nor decrease of the setting time and the adhesion are observed.

II. In addition to the good storage stability, when access to air is interrupted, the curing occurs rapidly, for example, to produce in a short time a high adhesive strength capable of withstanding a strong stress.

III. The composition exhibits an improved adhesion speed and adhesive strength to an inert base or substrate such as aluminum, chromium, stainless steel, nickel, cadmium and the like as well as an active base or substrate such as iron, copper and the like.

IV. Since a compound having at least two polymerizable double bonds is used as a monomer, the resulting cured composition has high heat resistance, solvent resistance and oil resistance, and therefore, the utility thereof increases to a great extent.

V. The setting time and the adhesive strength can be varied as desired and further the viscosity can be controlled by properly selecting the components of the composition.

Polyesterpolyacrylates and/or polyesterpolymethacrylates which are anaerobic monomers useful in composition according to this invention are described in detail hereinbelow, and comprise a compound having the structure of the following general formulae:

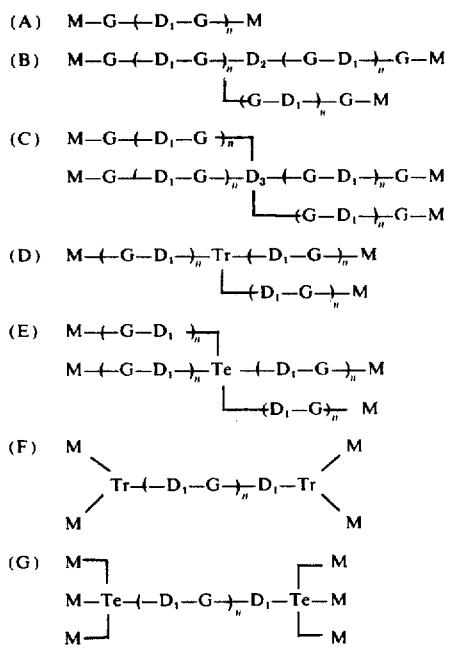

wherein M is acrylic acid or methacrylic acid residual group, G is a glycol residual group, Tr is a triol residual group, Te is a tetraol residual group, $D_1$ is a dibasic acid residual group, $D_2$ is a tribasic acid residual group, $D_3$ is a tetrabasic acid residual group and $n$ is an integer of 1–10.

Representative methods for producing a compound of the above mentioned formula include method of esterification of di-, tri or tetrahydric alcohol with acrylic acid and/or methacrylic acid and a polybasic acid, a method of esterification of a compound of the formula:

[H] M—G—OH wherein M and G are as defined above, with a polybasic acid and the like. A compound produced by a method other than the esterification reaction also can be used in this invention provided the compound has the same structure as that of the above described compound. In the case of using the compounds of the formulae [A] – [G] as an anaerobic monomer for the anaerobic curable composition according to the invention, it is not always necessary to use a single compound, but it may be mixed with one or more of the compounds selected from the group of the formulae [A] – [G]. Needless to say, it does not cause any trouble to use a mixture obtained as a by-product in the course of synthesis thereof wherein $n$ is zero in the aforementioned formulae, for example, polyetherpolymethacrylate, and other compound having a different $n$.

Polyesterpolyacrylate and polyesterpolymethacrylate may be produced by various methods and the resulting product is not a single compound but a mixture composed of various kinds of compounds, whatever synthesis method is adopted. The particular components of the resulting mixture have been recently resolved. For example, Japanese Patent Publication No. 11194/1971 discloses the following fact. That is oligomethacrylate produced from phthalic acid (P): ethyleneglycol (E): methacrylic acid (M) = 1 : 2 : 2.2 (molar ratio) is a compound of $n=1$ in the formula;

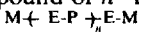

wherein each symbol is as defined above, in other words, a compound wherein the degree of condensation is "1", when it is theoretically considered from the molar ratio of the starting material. However, in practice, it is not a pure material of $n = 1$, but a mixture having the average condensation degree of "1".

However, with respect to each of the mixtures, it is not only complicated, but also difficult to separate each constituent thereof and determine the actual structural formula. Consequently in representing the chemical name and the chemical formula or structure of the product it is generally accepted that the average chemical formula of the product is hypothesized by the chemical reaction equation expected on the basis of the starting materials and the molar ratio, and the mixture is represented by the macroscopic theoretical compound thus hypothesized (see for example, U.S. Pat. Nos. 3,455,801, 3,451,980 and 3,631,154, Japanese Patent Publications Nos. 13546/1972 and 23661/1972).

Accordingly, each of the polyesterpolyacrylate and polyesterpolymethacrylate as described herein is represented by the aforementioned theoretical hypothesized compound in accordance with the usual practice.

As example of the reaction equation providing a basis for hypothesizing the average chemical formula, there may be mentioned the following equation (1) in case of using dibasic acid [as shown by the formula: $R'(COOH)_2$], triol [as shown by the formula: $R''(OH)_3$] and acrylic acid as the starting material, and the following equation (2) in case of dibasic acid, glycol [as shown by the formula $R'''(OH)_2$] and acrylic acid as the starting material (R', R" and R''' are a residual group of a dibasic acid, a residual group of a triol and a residual group of diol, respectively).

$$R'(-COOH)_2 + 2R''(-OH)_3 + 4CH_2=CHCOOH$$

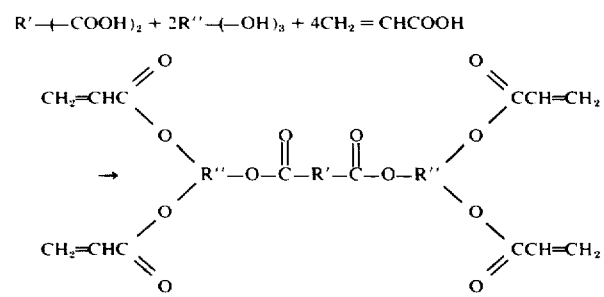 (1)

$$n[R'(-COOH)_2] + (n+1)[R'''(-OH)_2] + 2CH_2=CHCOOH$$

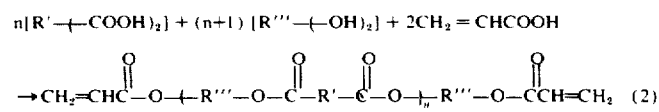 (2)

wherein $n$ is an integer of the value from 1 to 10.

In order to improve the industrial usefulness of the compositions according to this invention, the polymerizable compounds shown below may be blended thereto, if desired:

1. A compound of the aforementioned formula [H]: M—G—OH for the purpose of improving the adhesion strength.

2. A compound of the formula (I):

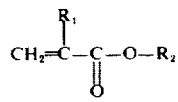

wherein $R_1$ is hydrogen or methyl, and $R_2$ is alkyl group having 1 - 8 carbon atoms,

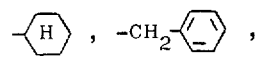

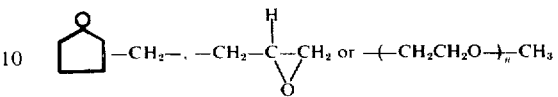

in which $n$ is an integer of 1 - 14, for the purpose of controlling viscosity or facilitating adhesion to a material or substrate on which fatty acids are deposited.

3. Epoxyacrylate and/or epoxymethacrylate containing the following structural unit which can be obtained by the reaction of an epoxy resin with acrylic acid and-/or methacrylic acid as illustrated by the reaction:

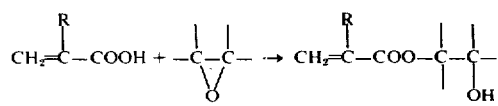

wherein R is hydrogen or methyl.

4. Trimethylolpropane trimethacrylate, neopentylglycol dimethacrylate, ethyleneglycol dimethacrylate, N,N-dimethylaminoethyl methacrylate, pentaerythritol tetramethacrylate and the like.

Compounds (1) - (4) as shown above may be blended to the polyesterpolyacrylate and/or polyesterpolymethacrylate at any ratio, preferably 1 - 70 percent by weight for the aforementioned purpose (1) or (2). When the polyester polyacrylate and/or polyester polymethacrylate or others are produced by using polymerization inhibitors, catalysts and the like, it is difficult to remove them completely. Polymerization inhibitor in an amount less than 300 ppm is usually added the above compounds for storage and hydroperoxides and accelerators may be blended in the presence of the polymerization inhibitor.

In order to improve the commercial value of the compositions of this invention, other compounds or materials as shown below may be added thereto. Desirable amounts of each material to be blended to the compositions are indicated in parentheses.

5. A dye or pigment (0.001-1% by weight) for the purpose of coloring.

6. A thixotropic agent (0.1–5% by weight) for the purpose of imparting thixotropy.

7. A soluble polymer (0.1–8% by weight) having a number average molecular weight of $10^4$–$10^6$ for the purpose of increasing the viscosity.

8. A plasticizer (0.1–5% by weight) for controlling the adhesion strength and improving the compatibility with material to be adhered.

The anaerobic monomer used in this invention is explained more in detail below. As the glycol unit in the aforementioned general formulae [A] – [G], there may be mentioned ethylene glycol, 1,2-propylene glycol, 1,3-propylene glycol, 1,3-butanediol, 1,4-butanediol, 1,6-hexanediol, neopentyl glycol, diethylene glycol, dipropylene glycol, triethylene glycol, tetraethylene glycol, polyethylene glycol, polypropylene glycol and the like. As the triol unit, there may be mentioned glycerine, trimethylolpropane, trimethylolethane, 1,2,6-hexanetriol and the like. As the tetraol unit, there may be mentioned pentaerythritol, diglycerol, 1,2,3,4-butanetetraol and the like. Among these polyols, ethylene glycol, propylene glycol, 1,3-butanediol, diethylene glycol, triethylene glycol, tetraethylene glycol, neopentyl glycol, trimethylol propane, trimethylol ethane and pentaerythritol are commercially available in a form of high purity and very reactive, and therefore, they are particularly preferable.

As the dibasic acid (anhydride) unit, there may be mentioned o-phthalic acid, tetrahydrophthalic anhydride, hexahydrophthalic anhydride, tetrachlorophthalic acid, tetrabromophthalic acid, malonic acid, succinic acid, adipic acid, azelaic acid, 1,12-dodecanoic acid, maleic acid, fumaric acid, itaconic acid, himic acid (endo-5-norbornene-2,3-dicarboxylic acid), het acid (1,4,5,6,7,7-hexachloro-endo-5-norbornene-2,3-dicarboxylic acid) and the like.

As the tribasic acid unit, there may be mentioned trimellitic acid, aconitic acid, butanetricarboxylic acid, butenetricarboxylic acid, 6-carboxyl-3-methyl-1,2,3,6-hexahydrophthalic acid and the like.

As the tetrabasic acid unit, there may be mentioned pyromellitic acid, butanetetracarboxylic acid and the like. Among these polybasic acids, phthalic acid, tetrahydrophthalic acid, adipic acid, and trimellitic acid are preferable and polyesterpolyacrylate and/or polyesterpolymethacrylate produced by using the above polybasic acids exhibit the anaerobic characteristics of the compounds (I) to (V) above.

Among the compounds of the general formula (H) the monoacrylate or monomethacrylate of glycol are included, and there may be mentioned β-hydroxyethyl acrylate, β-hydroxyethyl methacrylate, β-hydroxypropyl methacrylate, β-hydroxypropyl acrylate, 3-chloro-2-hydroxypropyl methacrylate and the like. Furthermore, a ring-opening addition reactant of monoepoxide and acrylic acid or methacrylic acid may be also included in addition to the above mentioned compounds.

As the monoacrylate and/or monomethacrylate represented by the general formula (I), there may be mentioned methyl methacrylate, ethyl methacrylate, cyclohexyl methacrylate, tetrahydrofurfuryl methacrylate, glycidyl methacrylate, t-butyl acrylate, glycidyl acrylate, cyclohexyl acrylate, n-butyl methacrylate, 2-ethylhexyl methacrylate, benzyl acrylate, allyl methacrylate, methoxypolyethylene glycol No. 400 methacrylate, and methoxypolyethylene glycol No. 200 methacrylate.

The hydroperoxide to be blended to the compositions according to this invention may be represented by the formula:

R—OOH wherein R is a hydrocarbon group having up to about 18 carbon atoms, such as aryl or aralkyl groups, preferably an alkyl having 4–12 carbon atoms. The R may contain a substituent which can form a ring group, and may be a substituent other than hydrocarbon, but it is necessary that the substituent does not adversely affect overall composition for the purposes of this invention. As representative preferred hydroperoxides, there may be mentioned t-butyl hydroperoxide, cumene hydroperoxide, diisopropylbenzene hydroperoxide, p-menthane hydroperoxide, 2,5-dimethylhexane-2,5-dihydroperoxide and the like.

A mixture of hydroperoxides, as well as one kind of the hydroperoxide, may be used and the amount of the hydroperoxide included in the compositions preferably ranges from 0.01 to 5 percent by weight. Further, when a mixture of hydroperoxides is used the total concentration preferably falls within the above mentioned percent by weight. As far as the aforementioned feature obtainable by using hydroperoxide is realizable, dialkyl peroxide, ketone peroxide, acyl peroxide and the like may be present with the hydroperoxide.

The cure accelerator, 1,1-dialkylhydrazine, for the composition to which the hydroperoxide is blended is explained in detail below.

1,1-Dialkylhydrazine may be represented by the general formula:

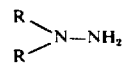

wherein R is an alkyl, preferably a loweralkyl group having 1-4 carbon atoms. As representative of the 1,1-dialkylhydrazines, there may be mentioned 1,1-dimethylhydrazine, 1,1-diethylhydrazine, 1,1-di-n-propylhydrazine, 1,1-di-n-butylhydrazine and the like, and representative salts thereof include the hydrochloride, sulfate, oxalate, and phosphate.

Among the 1,1-dialkylhydrazines and salts thereof, 1,1-dimethylhydrazine is particularly preferable since this compound is commercially available at high purity and the composition comprising the hydroperoxide and this compound can particularly impart the special characteristics as shown in items (I) to (III) above. The amount of 1,1-dialkylhydrazine or its salt included in the compositions preferably ranges from 0.001 to 5 percent by weight, more preferably from 0.01 to 3 percent by weight based on the total weight of the composition.

As described in the Examples hereinbelow the above compounds are remarkably effective as an accelerator for the anaerobic curable compositions.

Since the anaerobic curable compositions are required to possess a long-term stability, there may be added thereto a polymerization inhibitor such as hydroquinone, hydroquinone monomethylether, t-butylcatechol, 2,5-dihydroxy-p-quinone and the like, a chelating agent such as oxalic acid, ethylenediamine tetraacetate and the like, and a compound capable of inhibiting polymerization such as copper salts, according to a usual expedient. Furthermore, there may be added a UV absorber and a fluorescent dye.

This invention will be understood more readily by referring to the following examples.

In the examples, the parts are by weight unless otherwise specified.

Further, setting time, storage stability, prevailing torque strength and break away torque strength were measured by the following methods.

Setting time:

After the anaerobic curable composition was coated on a part to be adhered, for example, bolt and nut (ISO screw of each kind of material and having 10 mm. in diameter) and assembled, the time necessary until the bolt and nut were set (they do not move when they are rotated by fingers) were measured.

Storage stability (Gel time):

Since it takes a long time to test the storage stability of the anaerobic curable composition at room temperature, the gel time was measured by heating instead of measuring the time of the stability. It has been confirmed that a composition which does not gel even when allowed to stand for 120 minutes at 80°C possesses a storage stability more than one year at a normal temperature. Accordingly 1 cc. of the compositions placed in a container made of polyethylene and having a volume of 2 cc. and the time required until it gelled in the constant temperature bath kept at 80° ± 0.5°C was measured.

Prevailing torque:

The anaerobic curable composition was coated on the part (the same bolt and nut as those used in the measuring of the setting time) to fix the part, and the part aged at room temperature for 48 hours. The average value of the torque strength at ¼, ½, ¾ and 1/1 in rotation of the part thus treated was measured by using a torque wrench.

Break away torque:

A torque strength when the first movement occurred upon measuring the prevailing torque strength.

EXAMPLE 1

To 152g of tetrahydrophthalic anhydride, 212g of diethylene glycol and 172g of methacrylic acid, phenothiazine was added as a polymerization-inhibitor in the presence of sulfuric acid as a catalyst in toluene solvent and the reaction mixture esterified with heating and reflux. After completion of the reaction, the resulting mixture was washed with water and the solvent was removed to obtain polyester polymethacrylate. The product contained 10 ppm of phenothiazine and 3% by weight of toluene, and was a material which viscosity was 120 cp (25°C) and specific gravity was 1.131 (25°/25°).

This corresponds to a mixture of about 94 parts of the material having $n=0$ in the general formula (A), about 100 parts of the material having $n=1$, about 117 parts of the material having $n=2$ and about 79 parts of the material having $n=3$.

A composition obtained by adding 1 part of t-butylhydroperoxide and 0.1 part of the accelerator as shown in Table 1 to 100 parts of the anaerobic monomer mixture containing the resulting polyester polymethacrylate was subjected to each test to obtain the following results.

Table 1

| Accelerator | Storage Stability (Hr.) | Fe | | Al | |
|---|---|---|---|---|---|
| | | Setting Time (min.) | Torque Strength (kg.cm) | Setting Time (min.) | Torque Strength (kg.cm) |
| 1,1-dimethylhydrazine | >5 | <30 | 110/210 | <60 | 85/Broken |
| 1,1-dimethylhydrazinehydrochloride | 2 | <30 | 135/230 | <60 | 90/180 |

In the column of "Torque strength", the first value is that of break away torque and the second value is that of prevailing torque. "Broken" in the prevailing torque indicated that the bolt was broken.

EXAMPLE 2

80 parts of an anaerobic monomer mixture containing polyesterpolymethacrylate similar to that in Example 1, 20 parts of 2-hydroxyethyl methacrylate and 1 part of t-butylhydroperoxide were blended to produce a composition. 0.1 part of 1,1-dimethylhydrazine was mixed therewith. Test results of the product are shown in Table 2 below.

Table 2

| Storage Stability (Hr.) | Torque strength (Kg.cm) | | | | | | |
|---|---|---|---|---|---|---|---|
| | (break away torque/prevailing torque) | | | | | | |
| | Fe | Al | SUS | Zn | Ni | Cr | Brass |
| >5 | 175/230 | 155/Broken | 175/200 | 110/Broken | 80/310 | 40/135 | 320/Broken |

EXAMPLE 3

7 parts of methyl methacrylate polymer of number average molecular weight of $10^5$ was dissolved in a mixture (100 parts) of polyesterpolymethacrylate containing anaerobic monomer mixture, and then 1 part of t-butylhydroperoxide and 0.05 parts of 1,1-dimethylhydrazine were added thereto. The resulting mixture was coated on various bolts and nuts and subjected to various tests. The results are shown in Table 3.

Table 3

| Storage Stability (Hr.) | Fe | | Al | | SUS | | Zn | | Ni | | Cr | | Brass | |
|---|---|---|---|---|---|---|---|---|---|---|---|---|---|---|
| | ST min. | Torque Kg-cm | ST min. | Torque Kg-cm | ST min. | Torque Kg-cm | ST min. | Torque Kg-cm | ST min. | Torque Kg-cm | ST min. | Torque Kg-cm | ST min. | Torque Kg-cm |
| >5 | <30 | 110/ | <60 | 80/ | 60 | 80/ | 90 | 70/ | 90 | 130/ | 180 | 30/ | <5 | 295/ |

Table 3-continued

| Storage Stability (Hr.) | Fe | | Al | | SUS | | Zn | | Ni | | Cr | | Brass | |
|---|---|---|---|---|---|---|---|---|---|---|---|---|---|---|
| | ST min. | Torque Kg-cm | ST min. | Torque Kg-cm | ST min. | Torque Kg-cm | ST min. | Torque Kg-cm | ST min. | Torque Kg-cm | ST min. | Torque Kg-cm | ST min. | Torque Kg-cm |
| | | 235 | | Broken | | 180 | | 240 | | 215 | | 155 | | Broken |

ST: Setting time
In "Torque", the first value stands for a break way torque and the second value a prevailing torque. "Broken" means the bolt is broken.

EXAMPLE 4

To 100 parts of a polyesterpolymethacrylate containing anaerobic monomer mixture similar to that in Example 1 were added 1 part of t-butylhydroperoxide and 0.1 part of 1,1-dimethylhydrazine and then there was added thereto 0.05 parts of oxalic acid. The resulting mixture was tested with respect to various properties. The storage stability was longer than 8 hours and the setting time and torque strength with respect to Fe and Al bolts and nuts were almost the same as those of Example 1.

EXAMPLE 5

To 100 parts of a polyesterpolymethacrylate containing anaerobic monomer mixture was added 1 part of cumene hydroperoxide and 0.1 part of 1,1-dimethylhydrazine. The resulting composition was tested. The result of the tests is shown in Table 4 below.

Table 4

| Storage Stability (Hr.) | Fe | | Al | | SUS | | Zn | | Ni | | Cr | | Brass | |
|---|---|---|---|---|---|---|---|---|---|---|---|---|---|---|
| | ST min. | Torque Kg-cm | ST min. | Torque Kg-cm | ST min. | Torque Kg-cm | ST min. | Torque Kg-cm | ST min. | Torque Kg-cm | ST min. | Torque Kg-cm | ST min. | Torque kg-cm |
| >5 | <30 | 100/240 | <60 | 65/180 | <60 | 80/210 | 90 | 60/155 | 120 | 105/240 | 180 | 45/180 | <5 | 220/Broken |

EXAMPLE 6

To a starting material including 146g of adipic acid, 300g of triethylene glycol and 172g of methacrylic acid in toluene solvent, phenothiazine was added as a polymerization-inhibitor along with sulfuric acid as a catalyst and the resulting reaction mixture esterified with heat under reflux. Upon completion of the reaction, the resulting material was washed with water to remove the solvent to obtain a polyester polymethacrylate containing 8% by weight of the toluene. The product contained 12 ppm of phenothiazine and 8% by weight of toluene and had viscosity of 250 cp (25°C) and specific gravity of 1.119 (25°/25°). The product corresponded to a mixture of about 75 parts of the material having $n=0$, about 100 parts of the material having $n=1$, about 80 parts of the material having $n=2$ and about 58 parts of the material having $n=3$ in the general formula (A).

To 100 parts of the anaerobic monomer mixture containing the polyesterpolymethacrylate, 1 part of cumene hydroperoxide and 0.1 part of 1,1-dimethylhydrazine were blended and the resulting compositions tested. The results of the tests are shown in Table 5. Further, the storage stability of the composition was more than 8 hours.

Table 5

| Material | Setting Time (Minutes) | Break away Torque (Kg-cm) | Prevailing Torque (Kg-cm) |
|---|---|---|---|
| Fe | <30 | 35 | 90 |
| Al | <30 | 30 | 80 |
| SUS | 60 | 35 | 80 |
| Zn | 90 | 30 | 100 |
| Ni | 120 | 25 | 85 |
| Cr | 180 | 15 | 35 |
| Brass | 5 | 30 | 105 |

EXAMPLE 7

100 parts of a polyesterpolymethacrylate containing anaerobic monomer mixture similar to Example 6 was mixed with 30 parts of methoxypolyethylene glycol No. 400 methacrylate containing 0.5 ppm of copper ion and then there were added 1 part of t-butylhydroperoxide and 0.1 part of 1,1-dimethylhydrazine. The resulting composition was subjected to various tests. The results are shown in Table 6. The storage stability was more than 5 hours.

Table 6

| Materials | Setting Time (Minutes) | Break away Torque (Kg-cm) | Prevailing Torque (Kg-cm) |
|---|---|---|---|
| Fe | <30 | 30 | 130 |
| Al | <30 | 60 | 80 |
| SUS | <30 | 50 | 70 |
| Zn | 60 | 55 | 75 |
| Ni | 60 | 20 | 35 |
| Cr | 120 | 10 | 20 |
| Brass | 5 | 120 | 150 |

EXAMPLE 8

Following the procedure of Example 7 except that 20 parts of methoxypolyethyleneglycol No. 200 methacrylate was used in place of methoxypolyethyleneglycol No. 400 methacrylate, the resulting composition was tested in a way similar to Example 7. The results are shown in Table 7.

Table 7

| Material | Setting Time (Minutes) | Break away Torque (Kg-cm) | Prevailing Torque (Kg-cm) |
|---|---|---|---|
| Fe | <30 | 40 | 90 |
| Al | 60 | 30 | 40 |
| SUS | 60 | 30 | 60 |

Table 7-continued

| Material | Setting Time (Minutes) | Break away Torque (Kg-cm) | Prevailing Torque (Kg-cm) |
|---|---|---|---|
| Zn | 90 | 20 | 35 |
| Ni | 90 | 35 | 55 |
| Cr | 120 | 10 | 25 |
| Brass | 5 | 70 | 150 |

EXAMPLE 9

A composition obtained by blending 1 part of t-butyl hydroperoxide and 0.1 part of 1,1-dimethylhydrazine to 100 parts of a polyester polymethacrylate containing anaerobic monomer mixture similar to that in Example 1 was heated for 3 hours at 80°C and subjected to various tests. The results are shown in Table 8.

Table 8

| Material | Setting Time (Minutes) | Break away Torque (Kg-cm) | Prevailing Torque (Kg-cm) |
|---|---|---|---|
| Fe | <30 | 100 | 205 |
| Al | <30 | 85 | 215 |
| SUS | 60 | 140 | 255 |
| Zn | 60 | 110 | 335 |
| Ni | 90 | 80 | 250 |
| Cr | 180 | 40 | 275 |
| Brass | 5 | 220 | broken |

The results of Table 8 show that the anaerobic curable composition exhibits, in every case, excellent setting speed and torque strength even when heated for 3 hours at 80°C, and that there is no change of the properties even when the composition was stored for a long time.

EXAMPLE 10

100 parts of a polyesterpolymethacrylate containing anaerobic monomer mixture was mixed with 1 part of t-butylhydroperoxide, 0.1 part of 1,1-dimethylhydrazine, 0.05 parts of oxalic acid, 50 ppm of hydroquinone, 0.02 parts of Oil Red (RR) (dye, manufactured by Orient Kagaku), 0.03 parts of Tinuvin PS (2-(2'-hydroxy-5'-methyl-phenyl)-benzotriazole, UV absorber, manufactured by Ciba Geigy A.G.) and 0.1 part of White Flow B (Fluorescent dye, manufactured by Sumitomo Kagaku). The resulting composition was subjected to various tests. The results are shown in Table 9. The storage stability was more than 8 hours.

Table 9

| Material | Setting time (Minutes) | Break away Torque (Kg-cm) | Prevailing Torque (Kg-cm) |
|---|---|---|---|
| Fe | <30 | 110 | 225 |
| Al | <30 | 115 | broken |
| SUS | 60 | 130 | 240 |
| Zn | 60 | 90 | 320 |
| Ni | 90 | 90 | 245 |
| Cr | 180 | 45 | 170 |
| Brass | 5 | 200 | broken |

EXAMPLE 11

Phthalic anhydride 148g., diethyleneglycol 212g., and acrylic acid 158g were heated under reflux in the presence of $H_2SO_4$ as catalyst and phenothiazine as polymerization inhibitor to carry out the esterification, then washed with water and the solvent was removed to produce a polyesterpolyacrylate. The product was a mixture containing 10 ppm of phenothiazine and 3% by weight of toluene, having viscosity of 87 cp (25°C), specific gravity of 1.125 (25°/25°), and average molecular weight of about 450, and containing about 20% of diethyleneglycoldiacrylate.

100 parts of this polyesterpolyacrylate was mixed with 1 part of t-butylhydroperoxide and 0.1 part of 1,1-dimethylhydrazine, and the resulting composition was subjected to various tests. The storage stability was more than 5 hours, and setting time and torque strength of Fe and Al bolts and nuts are as shown in Table 10.

Table 10

| Material | Setting Time (Minutes) | Break away Torque (Kg-cm) | Prevailing Torque (Kg-cm) |
|---|---|---|---|
| Fe | <30 | 110 | 225 |
| Al | <30 | 70 | 190 |

We claim:

1. An anaerobic curable composition comprising a hydroperoxide in the amount 0.01–5% by weight based on said composition, a 1,1-dialkylhydrazine or its acid salt in the amount 0.001–5% by weight based on said composition, the alkyl groups making up said dialkylhydrazine being a $C_1$–$C_4$ alkyl, and the remainder of said composition comprising essentially a polyesterpolyacrylate and/or a polyesterpolymethacrylate or an anaerobic curable monomer mixture containing said polyesterpolyacrylate and/or said polyesterpolymethacrylate.

2. An anaerobic curable composition according to claim 1 in which a polymerization inhibitor and/or stabilizer selected from the class of hydroquinone, hydroquinone monomethylether, t-butylcatechol, 2,5-dihydroxy-p-quinone, oxalic acid, ethylenediamine tetraacetate and copper salts is added in an amount of less than 300 ppm.

3. An anaerobic curable composition according to claim 1 in which the hydroperoxide is selected from the group consisting of t-butylhydroperoxide, cumene hydroperoxide, diisopropylbenzene hydroperoxide, p-menthane hydroperoxide, and 2,5-dimethylhexane-2,5-dihydroperoxide.

4. An anaerobic curable composition according to claim 1 in which the salt of 1,1-dialkylhydrazine is a member selected from the group consisting of hydrochloride, sulfate, phosphate and oxalate.

5. An anaerobic curable composition according to claim 1 in which the 1,1-dialkylhydrazine is 1,1-dimethylhydrazine.

6. An anaerobic curable composition according to claim 1 in which the polybasic acid component of the polyesterpolyacrylate and/or polyesterpolymethacrylate is selected from the group consisting of phthalic acid, tetrahydrophthalic acid, adipic acid and trimellitic acid.

7. An anaerobic curable composition according to claim 1 in which the polyol component of the polyesterpolyacrylate and/or the polyesterpolymethacrylate is selected from the group consisting of ethyleneglycol, propylene glycol, 1,3-butanediol, diethylene glycol, triethylene glycol, tetraethylene glycol, neopentyl glycol, trimethylol propane, trimethylol ethane, and pentaerythritol.

8. An anaerobic curable composition according to claim 1 in which the concentration of the polyesterpolyacrylate and/or polyesterpolymethacrylate is at least 30% by weight.

* * * * *